D. F. PRINTZ.
SKATE ROLLER.
APPLICATION FILED JULY 30 1915.
1,274,078.
Patented July 30, 1918.
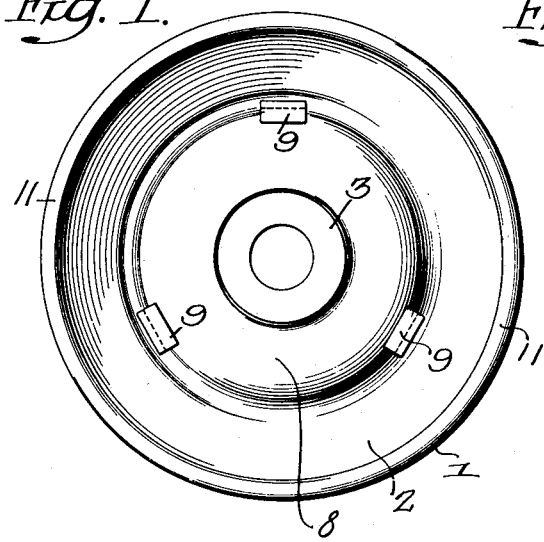
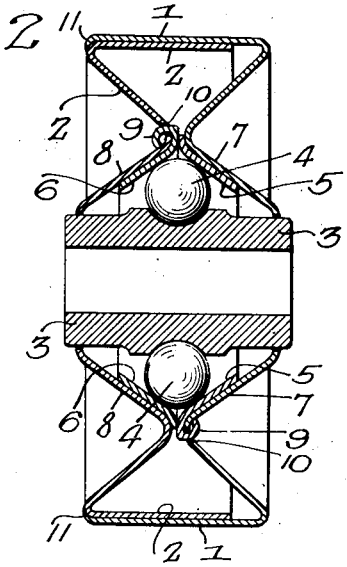
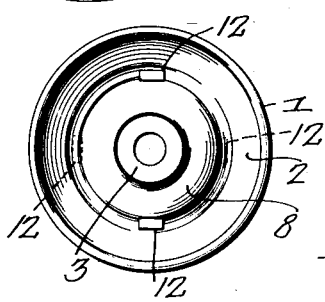
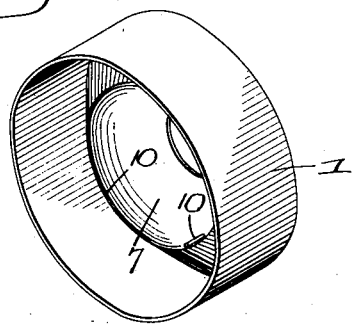
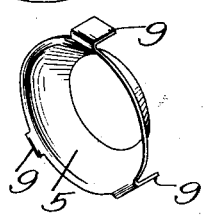
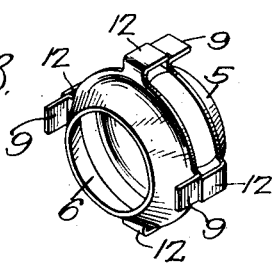
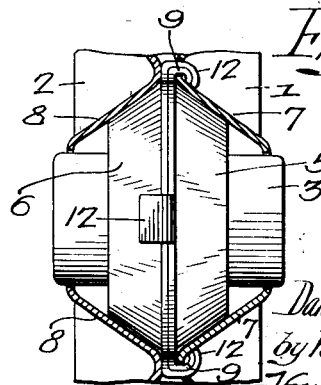
Inventor
Daniel F. Printz,
by his Attorneys,
Howson & Howson

UNITED STATES PATENT OFFICE.

DANIEL F. PRINTZ, OF READING, PENNSYLVANIA, ASSIGNOR TO AMERICAN SKATE & MANUFACTURING COMPANY, OF READING, PENNSYLVANIA, A CORPORATION OF PENNSYLVANIA.

SKATE-ROLLER.

1,274,078.　　　　　Specification of Letters Patent.　　Patented July 30, 1918.

Application filed July 30, 1915.　Serial No. 42,821.

*To all whom it may concern:*

Be it known that I, DANIEL F. PRINTZ, a citizen of the United States, residing in Reading, Berks county, State of Pennsylvania, have invented certain Improvements in Skate-Rollers, of which the following is a specification.

One object of my invention is to provide a simple and substantial roller skate roller which shall be inexpensive to construct as well as durable under conditions of use; the invention contemplating a novel arrangement of bearing rings and roller structure particularly designed to facilitate the assembling of the parts as well as reduce the cost of making the same.

Another object of the invention is to provide a novel form of bearing rings, particularly adapted for use in roller skate rollers, together with novel means whereby said rings are held in place, one form of the invention including a novel construction whereby the roller members and bearing rings are provided with common means for holding them in their assembled positions.

These objects and other advantageous ends I secure as hereinafter set forth, reference being had to the accompanying drawings, in which, Figures 1 and 2 are respectively a side elevation and a central vertical section of a roller constructed according to my invention;

Figs. 3, 4 and 5 are perspective views illustrating the detail construction of certain of the elements of the roller shown in Fig. 1;

Fig. 6 is a side elevation of a slightly modified form of a roller;

Fig. 7 is a fragmentary elevation, partly in section, illustrating the detail construction of the roller shown in Fig. 6; and Fig. 8 is a detached perspective view of two bearing rings shown in Fig. 7.

In Figs. 1 to 5 of the above drawings 1 and 2 represent two similar relatively shallow cups usually made of steel and of such dimensions that cup 2 fits snugly inside of low cups usually made of steel and of such dimensions that cup 2 fits snugly inside cup 1. The portion corresponding to the bottom of each cup is dished or projected inwardly to form an annular depression of angular section, and each of said members is centrally perforated for the reception of a hardened steel axle bushing 3 which, however, does not normally contact with the central hub portions 7 and 8 formed by dishing said cups 1 and 2. This bushing is formed with an annular centrally placed race-way in which is mounted a series of balls 4, which coöperate with a pair of conical bearing rings 5 and 6, so formed as to lie respectively parallel and in contact with the inner surface of the hub portions 7 and 8 of the roller members 1 and 2.

As shown in Fig. 4, each of the bearing rings is provided with a plurality of projecting lugs 9, designed to pass through openings 10 formed in the innermost portions of the dished bottoms of their respective roller members 1 and 2, and is permanently and immovably fixed to its supporting roller member by turning over or riveting these lugs 9 as shown in Fig. 2.

After the bearing rings have been attached to their respective roller members, the bushing 3 is inserted in one of the latter and the proper number of balls 4 is introduced between the bearing member 5 for example and the race-way in said bushing. The second roller member 2 is then inserted in the member 1 for the proper distance or until its bearing member 6 properly engages the balls, whereupon the free edge 11 of the roller member 1 is turned inwardly so as to permanently connect the various parts. Under these conditions the bushing 3, while being concentric with the openings in the hub portions 7 and 8 of the members 1 and 2, is out of engagement with them, and said roller members with their bearing rings are free to turn as a unit upon the balls which roll upon the axle bushing 3.

While in the construction above described the bearing rings are independently held to their respective members 1 and 2 by the lugs 9, I may, as shown in Figs. 6 to 8 inclusive, so form and assemble the parts that said lugs in addition serve to hold together said members 1 and 2. With this idea in view, each of the bearing rings 5 and 6 is provided with a pair of oppositely disposed lugs 9 as before, and in addition has a second pair of oppositely disposed lugs 12 midway between but projecting in a direction opposite from that of said lugs 9. The proportioning of the parts is such that each pair of lugs 12 belonging to one of the bearing rings fits over and lies parallel with the lugs 9 of the other bearing ring, and each of the two contacting sets of lugs 9 and 12 pass together through one of the openings at the base of the hub of the roller member 1, while the other pairs of oppositely extending lugs similarly pass through openings in the member 2, all of said lugs being turned over when the parts are finally assembled so as to rigidly connect the bearing rings and said roller members.

It will thus be seen that where one set of lugs extends through and is riveted to the bottom or hub portion of the member 1 for example, the next set extends through and is riveted to the hub of the roller member 2 so that the several sets of lugs serve to hold together and reinforce the web or dished portions of the roller members, whose outer portions may or may not be rigidly connected as indicated in Fig. 2.

Obviously the above described construction is relatively inexpensive, for the elements 1, 2, 5 and 6 may be cheaply and rapidly pressed from sheet metal and thereafter assembled with the balls and axle bushing, with the expenditure of a minimum of the time and labor.

In addition to being relatively light, the ground engaging portion or element formed by the two members 1 and 2 is structurally strong, especialy since its cylindrical portion consists of two intimately associated thicknesses of material.

I claim:—

1. A skate roller including a body having two dished portions of angular section; conical bearing rings respectively parallel to and engaging the inner conical surface of said dished portions; an axle member extending through said body; with antifriction elements mounted between the bearing rings and said member; each of said rings having lugs rigidly holding it to at least one of said dished portions.

2. A skate roller consisting of two members constituting a body and oppositely dished to form relatively deep annular depressions of V-shaped section in the sides of said body; two bearing rings having lugs extending through openings in the deepest parts of the depressions in the body; an axle member; and antifriction elements mounted between said axle member and the bearing rings.

3. A skate roller consisting of two dished members constituting a body; two conical bearing rings respectively parallel to and lying in engagement with the inner surface of the dished portions of said members; means for holding said bearing rings from rotation relatively to the dished members; an axle member; and antifriction elements mounted between the axle member and the bearing rings.

4. A skate roller consisting of two dished members constituting the body of a roller; two conical bearing rings parallel to and lying in engagement with the inner surface of the dished portions of said members respectively; an axle member; antifriction elements mounted between the axle member and the bearing rings; with lugs projecting from the base portions of said bearing rings and riveted to the dished members.

DANIEL F. PRINTZ.